United States Patent
Saito et al.

(10) Patent No.: US 8,758,917 B2
(45) Date of Patent: Jun. 24, 2014

(54) SECONDARY BATTERY

(75) Inventors: Taira Saito, Aichi-ken (JP); Musashi Nakagane, Toyota (JP); Satoru Suzuki, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/063,000

(22) PCT Filed: May 21, 2010

(86) PCT No.: PCT/JP2010/058610
§ 371 (c)(1),
(2), (4) Date: Mar. 9, 2011

(87) PCT Pub. No.: WO2011/145205
PCT Pub. Date: Nov. 24, 2011

(65) Prior Publication Data
US 2013/0071710 A1    Mar. 21, 2013

(51) Int. Cl.
*H01M 10/36* (2010.01)

(52) U.S. Cl.
USPC ............................................ 429/94; 429/517

(58) Field of Classification Search
USPC .......................... 429/176, 185, 94, 517, 519
See application file for complete search history.

(56) References Cited

U.S. PATENT DOCUMENTS

| | | |
|---|---|---|
| 6,692,863 B1 | 2/2004 | Nakanishi et al. |
| 2005/0136325 A1* | 6/2005 | Fujihara et al. ............... 429/176 |
| 2007/0122715 A1 | 5/2007 | Fujino et al. |
| 2011/0052975 A1* | 3/2011 | Lee .............................. 429/178 |

FOREIGN PATENT DOCUMENTS

| | | |
|---|---|---|
| CN | 1283879 | 2/2001 |
| CN | 1864288 | 11/2006 |
| JP | 2001-185225 | 7/2001 |
| JP | 2006-338992 | 12/2006 |
| JP | 2007-18968 | 1/2007 |
| JP | 2009-259450 | 11/2009 |

* cited by examiner

*Primary Examiner* — Mark F Huff
*Assistant Examiner* — Monique Wills
(74) *Attorney, Agent, or Firm* — Finnegan, Henderson, Farabow, Garrett & Dunner, LLP (57) ABSTRACT

In a lithium-ion secondary battery (100), a battery case (300) has sidewalls (300A, 300B) facing toward side ends of a wound electrode body (200), the side ends being at opposite lateral sides of the positive electrode sheet (220), and of the sidewalls (300A, 300B), one of the sidewalls (300A) (positive-electrode-side sidewall) facing toward an uncoated portion (222) of the positive electrode sheet (220) is thicker than the other sidewall (300B) (negative-electrode-side sidewall). In other words, the relationship between the thickness A of the one sidewall (300A) facing toward the uncoated portion (222) of the positive electrode sheet (220) and the thickness B of the other sidewall (300B) is A>B.

7 Claims, 5 Drawing Sheets

SECONDARY BATTERY

CROSS-REFERENCE TO RELATED APPLICATIONS

This application is a national phase application of International Application No. PCT/JP2010/058610, filed May 21, 2010, the contents of which are incorporated herein by reference.

TECHNICAL FIELD

The present invention relates to secondary batteries. In this description, a "secondary battery" is a concept that encompasses what is called electrical storage devices, including electric double-layer capacitors and storage batteries, such as lithium-ion secondary batteries, lithium metal secondary batteries, nickel-metal hydride (Ni-MH) batteries, and nickel-cadmium (Ni—Cd) rechargeable batteries.

BACKGROUND ART

The importance of secondary batteries has been increasing in applications as the on-vehicle electric power sources and the electric power sources for personal computers and mobile information terminals. Regarding such secondary batteries, JP 2001-185225 A (Patent Document 1), for example, discloses a lithium-ion secondary battery in which a plurality of oblong cylindrical-shaped battery elements are enclosed in a battery case so that the side faces of the oblong cylindrical shapes are attached to each other, and a heat releasing member is disposed between the battery case and the battery elements.

An example of the secondary battery that is lightweight and achieves high energy density is a lithium-ion secondary battery. The lithium-ion secondary battery is expected to be used suitably for an on-vehicle high-power electric power source. A typical example of the lithium-ion secondary battery includes positive and negative electrodes each having an electrode active material that can absorb and release lithium ions, a separator disposed between them, and a non-aqueous electrolyte solution. A known example of such a lithium-ion secondary battery has a construction in which an electrode assembly (wound electrode body), made by interposing separators between positive and negative electrode sheets and winding them together, is enclosed in a battery case (battery container) with a non-aqueous electrolyte solution, the electrode assembly. This type of battery is disclosed in, for example, JP 2007-18968 A (Patent Document 2).

PATENT DOCUMENTS

[Patent Document 1] JP 2001-185225 A
[Patent Document 2] JP 2007-18968 A

SUMMARY OF INVENTION

Technical Problem

It is desired for a secondary battery to have improved energy density although safety needs to be ensured. Energy density includes volumetric energy density (Wh/L) and gravimetric energy density (Wh/kg) in terms of comparison relative to size and weight. Volumetric energy density indicates the capacity per unit volume of a battery. Gravimetric energy density indicates the capacity per unit weight of a battery.

It is desirable that a secondary battery have a higher volumetric energy density or a higher gravimetric energy density as long as the size is the same. For example, when a heat releasing member is disposed between the battery case and the battery elements as disclosed in Patent Document 1, the space for accommodating the battery elements becomes narrower corresponding to the space for the heat releasing member. When the space for accommodating the battery elements becomes narrower and the size of the battery elements gets smaller, the energy density lowers accordingly. For this reason, it is desirable to ensure a larger space for accommodating the battery elements for the battery cases of the same size. For on-vehicle applications and mobile applications, one with a less weight is more desirable when the capacity and the output power of the batteries are the same.

In addition, the lithium-ion secondary battery may be in an overcharge condition due to some kind of abnormality, which may result in heat generation and gas formation at the later stage of overcharge. In addition, the lithium-ion secondary battery may be in an overcharge condition due to some kind of abnormality, which may result in heat generation and gas formation at the later stage of overcharge. For this reason, safety measures such as stopping charging upon an abnormality in the system are taken.

The present invention proposes a novel structure of a secondary battery in which an electrode assembly (wound electrode body) having positive and negative electrode sheets stacked and wound in a longitudinal direction with separators interposed therebetween is enclosed in a case (battery container) together with a non-aqueous electrolyte solution, that can improve the energy density while at the same time improving the safety.

Solution to Problem

According to the present invention, a secondary battery comprises a wound electrode body having a strip-shaped positive electrode sheet, a strip-shaped negative electrode sheet, and a strip-shaped separator interposed between the positive and negative electrode sheets, the positive and negative electrode sheets and the separator stacked and wound together; a battery case enclosing the wound electrode body; and a positioning member for positioning the wound electrode body in the battery case.

The positive electrode sheet comprises a strip-shaped positive electrode current collector, an uncoated portion provided in the positive electrode current collector along one lateral-side edge of the positive electrode current collector, and a positive electrode mixture layer comprising a positive electrode mixture, coated on both faces of the positive electrode current collector except the uncoated portion and containing a positive electrode active material.

The negative electrode sheet comprises a strip-shaped negative electrode current collector, an uncoated portion provided in the negative electrode current collector along one lateral-side edge of the negative electrode current collector, and a negative electrode mixture layer, coated on both faces of the negative electrode current collector excluding the uncoated portion so as to be wider than the positive electrode mixture layer, comprising a negative electrode mixture containing a negative electrode active material.

The positive electrode sheet and the negative electrode sheet are opposed to each other so that the positive electrode mixture layer is covered by the negative electrode mixture layer, and the positive electrode sheet and the negative electrode sheet are stacked on each other so that the uncoated portion of the positive electrode sheet and the uncoated portion of the negative electrode sheet protrude from each other in opposite lateral directions of the separator. The wound electrode body is wound around a winding axis set in a lateral direction of the stacked positive electrode sheet.

The battery case has sidewalls facing toward respective side ends of the wound electrode body, the side ends being at opposite lateral sides of the positive electrode sheet, and of the side walls of the battery case, one of the sidewalls facing toward the uncoated portion of the positive electrode sheet is thicker than the other one of the sidewalls.

In this secondary battery, of the sidewalls of the battery case, the one of the sidewalls facing toward the uncoated portion of the positive electrode sheet is thicker than the other sidewall. The safety of the secondary battery is greater than that in the case where both sidewalls of the battery case facing the respective side ends of the wound electrode body have the same thickness.

In this case, the difference (A−B) between the thickness A of the one sidewall facing toward the uncoated portion of the positive electrode sheet and the thickness B of the other sidewall may be equal to or greater than 0.05 mm. The ratio (A/B) of the thickness A of the one sidewall facing toward the uncoated portion of the positive electrode sheet and the thickness B of the other sidewall may be equal to or greater than 1.1.

In addition, the positive electrode current collector may have a thermal conductivity less than that of the negative electrode current collector. Moreover, the battery case may comprise a case main body in a closed-bottom quadrangular prismatic tubular shape and a lid closing an opening of the case main body.

DESCRIPTION OF EMBODIMENTS

Hereinbelow, a secondary battery according to one embodiment of the present invention will be described with reference to the drawings. The members and components that exhibit the same workings are denoted by the same reference symbols as appropriate.

Figure 1:
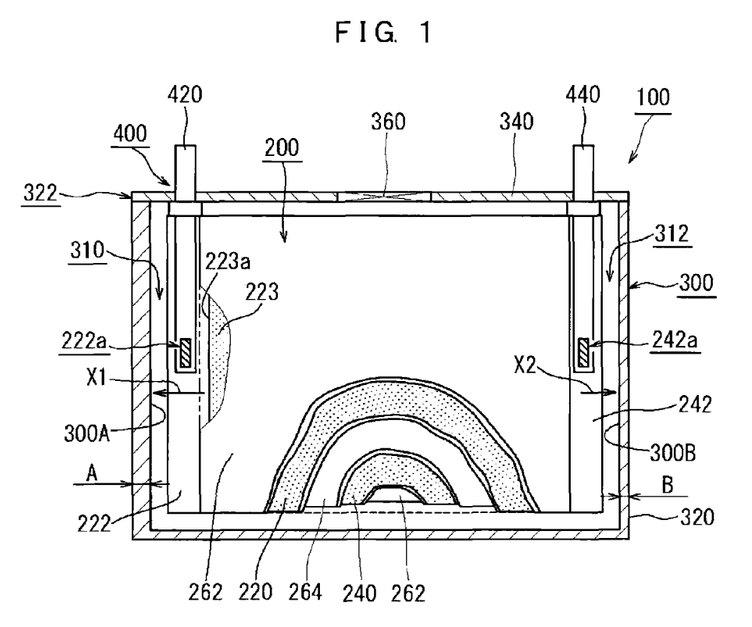
FIG. 1 is a drawing illustrating one example of a lithium-ion secondary battery.
Figure 2:
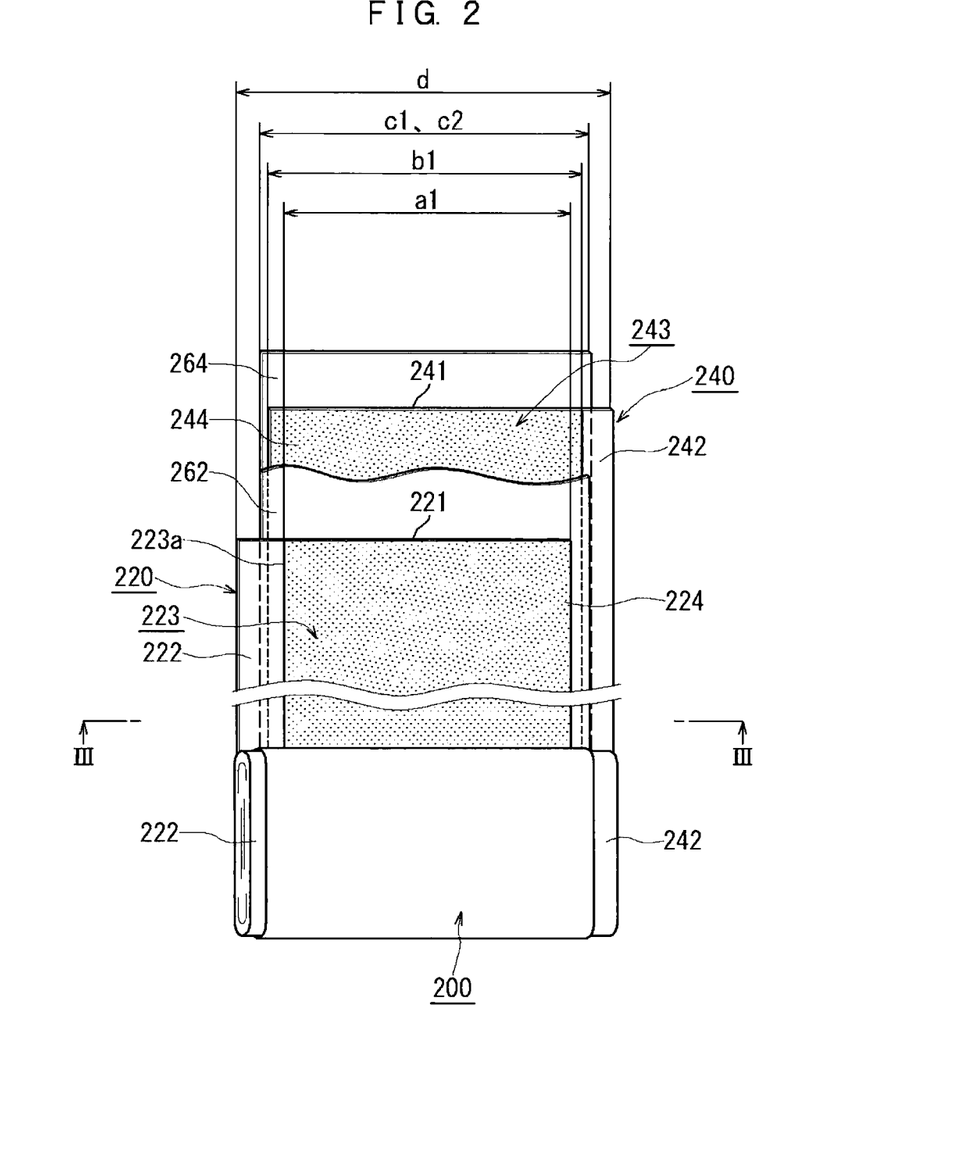
FIG. 2 is a drawing illustrating a wound electrode body of the lithium-ion secondary battery.
Figure 3:
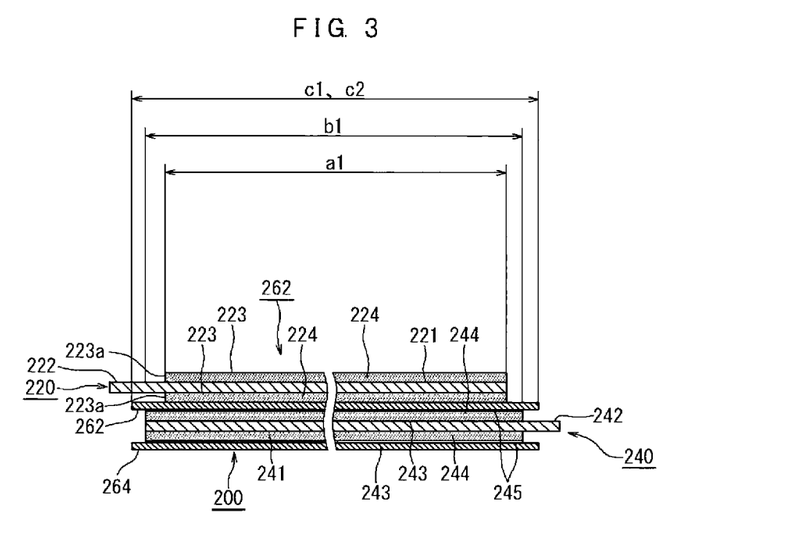
FIG. 3 is a drawing illustrating a wound electrode body of the lithium-ion secondary battery.

FIG. 1 illustrates a lithium-ion secondary battery 100 according to one embodiment of the present invention. As illustrated in FIG. 1, this lithium-ion secondary battery 100 has a wound electrode body 200 and a battery case 300. FIG. 2 is a drawing illustrating the wound electrode body 200. FIG. 3 shows a cross section taken along line in FIG. 2.

As illustrated in FIG. 2, the wound electrode body 200 has a positive electrode sheet 220, a negative electrode sheet 240, and separators 262 and 264. The positive electrode sheet 220, the negative electrode sheet 240, and the separators 262 and 264 are strip-shaped sheets.

<<Positive Electrode Sheet 220>>

The positive electrode sheet 220 has a strip-shaped positive electrode current collector 221 (positive electrode core material), as illustrated in FIG. 2. A metal foil suitable for the positive electrode may be used preferably for the positive electrode current collector 221. A strip-shaped aluminum foil having a predetermined width is used for this positive electrode current collector 221. The positive electrode sheet 220 includes an uncoated portion 222 and a positive electrode mixture layer 223. The uncoated portion 222 is provided along one lateral-side edge of the positive electrode current collector 221. The positive electrode mixture layer 223 is a coating layer of a positive electrode mixture 224 containing a positive electrode active material. The positive electrode mixture 224 is coated on both faces of the positive electrode current collector 221 except the uncoated portion 222 provided in the positive electrode current collector 221.

Here, the positive electrode mixture 224 is a mixture in which the positive electrode active material, a conductive agent, a binder, and the like are mixed together. Any substance that is used as the positive electrode active material of lithium-ion secondary batteries may be used for the positive electrode active material without any particular limitation. Examples of the positive electrode active material include lithium transition metal oxides such as $LiNiO_2$, $LiCoO_2$, and $LiMn_2O_4$.

<<Negative Electrode Sheet 240>>

The negative electrode sheet 240 has a strip-shaped negative electrode current collector 241 (negative electrode core material), as illustrated in FIG. 2. A metal foil suitable for the negative electrode may be used preferably for the negative electrode current collector 241. A strip-shaped copper foil having a predetermined width is used for this negative electrode current collector 241. The negative electrode sheet 240 includes an uncoated portion 242 and a negative electrode mixture layer 243. The uncoated portion 242 is provided along one lateral-side edge of the negative electrode current collector 241. The negative electrode mixture layer 243 is a coating layer of a negative electrode mixture 244 containing a negative electrode active material. The negative electrode mixture 244 is coated on both surfaces of the negative electrode current collector 241 except the uncoated portion 242 provided in the negative electrode current collector 241.

Here, the negative electrode mixture 244 is a mixture in which the negative electrode active material, a conductive agent, a binder, and the like are mixed together. Any substance that is used as the negative electrode active material of lithium-ion secondary batteries may be used for the negative electrode active material without any particular limitation. Examples of the negative electrode active material include: carbon-based materials such as natural graphite, artificial graphite, amorphous carbons of natural graphite and artificial graphite; lithium transition metal oxides; and lithium transition metal nitrides. As illustrated in FIG. 3, a heat-resistant layer 245 (HRL) is further formed on a surface of the negative electrode mixture layer 243. For the heat-resistant layer 245, a layer containing a metal oxide (such as alumina) is formed. It should be noted that although in the lithium-ion secondary battery 100, a heat-resistant layer is formed on the surface of the negative electrode mixture layer 243, it is possible to form the heat-resistant layer on a surface of each of the separators 262 and 264.

<<Separators 262 and 264>>

Each of the separators 262 and 264 is a member for separating the positive electrode sheet 220 and the negative electrode sheet 240 from each other. In this example, each of the separators 262 and 264 is made of a strip-shaped sheet having a plurality of micropores and having a predetermined width. Preferable examples of the separators 262 and 264 include a single layer or stacked layer structure made of porous polyolefin-based resin. In this example, as illustrated in FIGS. 2 and 3, the width b1 of the negative electrode mixture layer 243 is slightly wider than the width a1 of the positive electrode mixture layer 223, and moreover, the widths c1 and c2 of the separators 262 and 264 are slightly wider than the width b1 of the negative electrode mixture layer 243 (i.e., c1, c2>b1>a1).

<<Wound Electrode Body 200>>

The positive electrode sheet 220 and the negative electrode sheet 240 of the wound electrode body 200 are stacked and wound with the separators 262 and 264 interposed therebetween.

As illustrated in FIG. 2, in this example, the positive electrode sheet 220, the negative electrode sheet 240, and the separators 262 and 264 are aligned in the same longitudinal direction and stacked in the following order: the positive electrode sheet 220, the separator 262, the negative electrode sheet 240, and the separator 264. At this time, the separators 262 and 264 are stacked over the positive electrode mixture layer 223 and the negative electrode mixture layer 243. The width of the negative electrode mixture layer 243 is slightly wider than the positive electrode mixture layer 223. The negative electrode mixture layer 243 is stacked over the positive electrode mixture layer 223. This enables lithium (Li) ions to transfer between the positive electrode mixture layer 223 and the negative electrode mixture layer 243 during charge and discharge more reliably.

Moreover, the positive electrode sheet 220 and the negative electrode sheet 240 are stacked so that the uncoated portion 222 of the positive electrode sheet 220 and the uncoated portion 242 of the negative electrode sheet 240 protrude in opposite lateral directions from the separators 262 and 264. The stacked sheets (e.g., the positive electrode sheet 220) are wound around a winding axis set in a lateral direction. Herein, for convenience in illustration, the side on which the uncoated portion 222 of the positive electrode current collector 221 protrudes from the separators 262 and 264 is referred to as the "positive electrode side," as necessary. Likewise, the side on which the uncoated portion 242 of the negative electrode current collector 241 protrudes from the separators 262 and 264 is referred to as the "negative electrode side," as necessary.

The wound electrode body 200 is wound while stacking the positive electrode sheet, 220, the negative electrode sheet 240, and the separators 262 and 264 on each other. In this fabrication step, these sheets are stacked one on top of the other while controlling the respective positions of the sheets by, for example, EPC (Edge Position Control). In this case, the negative electrode mixture layer 243 is stacked over the positive electrode mixture layer 223 so as to cover the positive electrode mixture layer 223 while the separators 262 and 264 are interposed therebetween.

<<Battery Case 300>>

In this example, as illustrated in FIG. 1, the battery case 300 is what is called a prismatic battery case, and it includes a case main body 320 and a lid 340. The case main body 320 has a closed-bottom quadrangular prismatic tubular shape, and is a flat-box-shaped case and whose one side (upper face) is open. The lid 340 is a member that is attached to the opening of the case main body 320 (the opening in the upper face thereof) to close the opening.

For an on-vehicle secondary battery, it is desired to improve the weight energy efficiency (the capacity of the battery per unit weight) in order to improve fuel consumption. For this reason, it is desired to employ a lightweight metal such as aluminum or an aluminum alloy (aluminum in this example) for the case main body 320 and the lid 340, which constitute the battery case 300. Thereby, the weight energy efficiency can be improved.

The battery case 300 has a flat rectangular internal space as the space for accommodating the wound electrode body 200. As illustrated in FIG. 2, the flat internal space of the battery case 300 has a slightly wider width (lateral width) than the wound electrode body 200. In this embodiment, the wound electrode body 200 is accommodated in the internal space of the battery case 300. As illustrated in FIG. 1, the wound electrode body 200 is enclosed in the battery case 300 in such a manner that it is deformed in a flat shape in one direction perpendicular to the winding axis.

In addition, in this embodiment, the battery case 300 has sidewalls 300A and 300B facing toward the respective side ends of the wound electrode body 200, the side ends being at the opposite lateral sides of the positive electrode sheet 220. Of the sidewalls 300A and 300B, the one sidewall 300A (the positive-electrode-side sidewall), which faces toward the uncoated portion 222 of the positive electrode sheet 220, is thicker than the other sidewall 300B (the negative-electrode-side sidewall), which faces toward the opposite side (the uncoated portion 242 of the negative electrode sheet 240). In other words, where the thickness of the one sidewall 300A facing toward the uncoated portion 222 of the positive electrode sheet 220 is A and the thickness of the other sidewall 300B is B, the thicknesses A and B have the relationship A>B. Here, the difference (A−B) between the thicknesses of the two sidewalls 300A and 300B is, for example, equal to or greater than 0.05 mm.

In this embodiment, the battery case 300 has the case main body in a closed-bottom quadrangular prismatic tubular shape and the lid 340 closing the opening of the case main body 340. The lithium-ion secondary battery 100 is configured in such a manner that in the case main body 320 in a closed-bottom quadrangular prismatic tubular shape, the positive-electrode-side sidewall 300A is made thicker than the negative-electrode-side sidewall 300B. In this embodiment, when forming the case main body 320, the positive-electrode-side sidewall 300A is made thicker than the negative-electrode-side sidewall 300B. The case main body 320 may be formed by, for example, deep drawing or impact molding. Note that the impact molding is one type of cold forging, and is also referred to as impact extrusion or impact pressing.

To the lid 340 of the battery case 300, electrode terminals 420 and 440 are attached. The electrode terminals 420 and 440 penetrate through the battery case 300 (the lid 340) and stick out outside the battery case 300. The battery case 300 is provided with a safety vent 360. In this example, the safety vent 360 is provided at the midpoint between the electrode terminals 420 and 440 in the lid 340. The vent port in which the safety vent 360 is provided is in an elliptic shape with a short side of 5 mm and a long side of 15 mm.

<<Positioning Member 400>>

A positioning member 400 is a member for positioning the wound electrode body 200 in the battery case 300, as illustrated in FIG. 1. In this example, the electrode terminals 420 and 440 attached to the battery case 300 (to the lid 340 in this example) are used as the positioning member 400. The wound electrode body 200 is enclosed in the battery case 300 in such a manner that it is deformed in a flat shape in one direction perpendicular to the winding axis. In the wound electrode body 200, the uncoated portion 222 of the positive electrode sheet 220 and the uncoated portion 242 of the negative electrode sheet 200 protrude in opposite lateral directions from the separators 262 and 264. Of these, one electrode terminal 420 is fixed to the uncoated portion 222 of the positive electrode current collector 221, while the other electrode terminal 440 is fixed to the uncoated portion 222 of the negative electrode current collector 241.

In this example, as illustrated in FIG. 1, the electrode terminals 420 and 440 in the lid 340 extend to respective intermediate portions 222a and 242a of the uncoated portion 222 and the uncoated portion 242 of the wound electrode body 200. The foremost end portions of the electrode terminals 420 and 440 are welded to the respective intermediate portions of the uncoated portion 222 and the uncoated portion 242.

Figure 4:
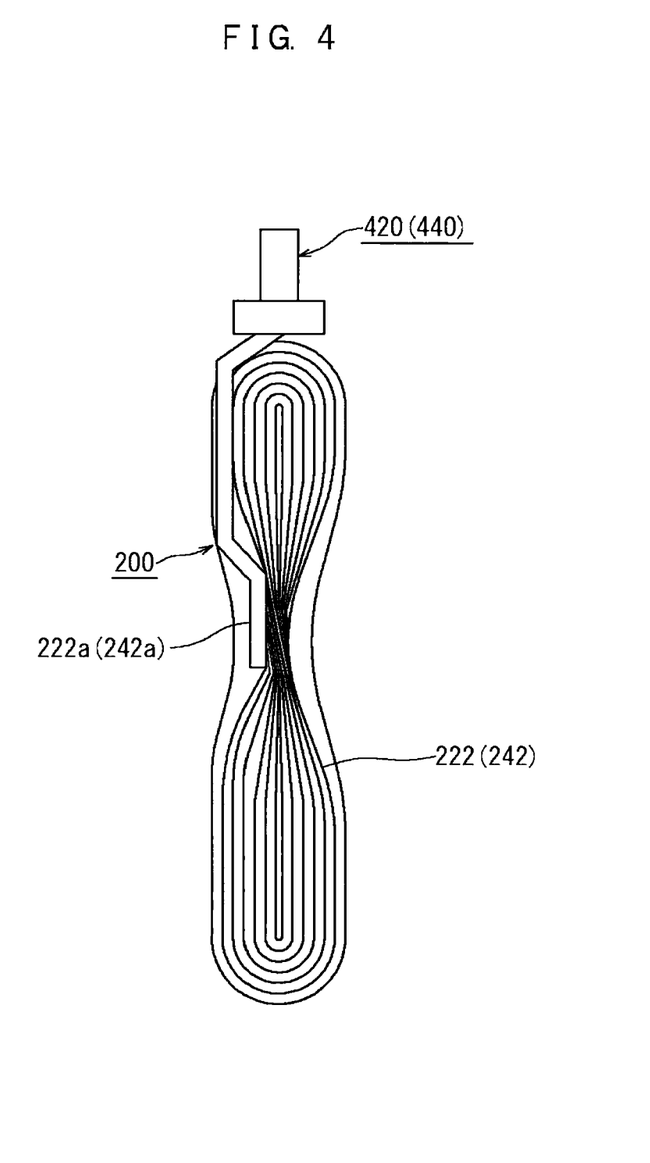
FIG. 4 is a drawing illustrating a portion where the wound electrode body and an electrode terminal are fixed.

FIG. 4 is a side view illustrating the portion where the uncoated portion 222 or 242 of the wound electrode body 200 is welded to the electrode terminal 420 or 440. As illustrated in FIG. 4, the uncoated portion 222 of the positive electrode current collector 221 and the uncoated portion 242 of the negative electrode current collector 241 are exposed from the respective sides of the separators 262 and 264 in a spiral shape. In this embodiment, these uncoated portions 222 and 242 are gathered at their intermediate portions and are welded to the foremost end portions of the respective electrode terminals 420 and 440. In this case, ultrasonic welding, for example, is used for welding the electrode terminal 420 and the positive electrode current collector 221 to each other because of the difference in their materials. On the other hand, resistance welding, for example, is used for welding the electrode terminal 440 and the negative electrode current collector 241 to each other.

Thus, the wound electrode body 200 is attached to the electrode terminals 420 and 440 fixed to the lid 340 in such a manner that it is deformed in a flat shape. The wound electrode body 200 is accommodated in the flat internal space of the case main body 320. The case main body 320 is closed by the lid 340 after the wound electrode body 200 is placed therein. A joint portion 322 (see FIG. 1) between the lid 340 and the case main body 320 is welded and sealed by, for example, laser welding. Thus, in this example, the wound electrode body 200 is positioned in the battery case 300 by the electrode terminals 420 and 440 fixed to the lid 340 (i.e., the battery case 300).

<<Electrolyte Solution>>

Thereafter, an electrolyte solution is filled into the battery case 300 through a filling port provided in the lid 340. The electrolyte solution used in this example is an electrolyte solution in which $LiPF_6$ is contained at a concentration of about 1 mol/L in a mixed solvent of ethylene carbonate and diethyl carbonate (e.g., a mixed solvent with a volume ratio of about 1:1). Thereafter, a metal sealing cap is attached (welded, for example) to the filling port to seal the battery case 300. For the electrolyte solution, any non-aqueous electrolyte solution that has conventionally been used for lithium-ion secondary batteries may be used without any particular limitation.

<<Gas Release Passage>>

In this example, the flat internal space of the battery case 300 is slightly wider than the wound electrode body 200 deformed in a flat shape. Gaps 310 and 312 are provided between the wound electrode body 200 and the battery case 300 at the respective sides of the wound electrode body 200. Each of the gaps 310 and 312 serves as a gas release passage.

In the lithium-ion secondary battery 100 with such a configuration, the temperature rises when overcharge takes place. When the temperature of the lithium-ion secondary battery 100 rises, the electrolyte solution is decomposed and gas is generated. The generated gas can be smoothly discharged outside, through the gaps 310 and 312 between the wound electrode body 200 and the battery case 300 at the opposite sides of the wound electrode body 200 and then through the safety vent 360. In the lithium-ion secondary battery 100, the positive electrode current collector 221 and the negative electrode current collector 241 of the wound electrode body 200 are electrically connected to an external device via the electrode terminals 420 and 440 penetrating through the battery case 300.

<<Lithium-Ion Secondary Battery 100>>

The positive electrode active material in the positive electrode mixture layer 223 of the lithium-ion secondary battery 100 is a lithium transition metal oxide, which does not easily conduct electricity. The positive electrode mixture layer 223 is ensured to have electrical conductivity by mixing a conductive agent therein. In addition, in this embodiment, the heat-resistant layer 245 (see FIG. 3) is provided on each surface of the negative electrode mixture layer 243. The heat-resistant layer 245 contains a metal oxide as its main component and has insulative properties. Therefore, the resistance between the positive electrode mixture layer 223 and the negative electrode mixture layer 243 is high. Consequently, even when the positive electrode mixture layer 223 and the negative electrode mixture layer 243 come into contact with each other in an overcharge condition, high current does not easily pass therethrough.

Nevertheless, the temperature of the lithium-ion secondary battery 100 gradually rises because the overcharge proceeds. The present inventors examined the conditions of the lithium-ion secondary battery 100 up to a late stage of overcharge by, for example, causing the lithium-ion secondary battery 100 to undergo an overcharge condition and disassembling the lithium-ion secondary battery 100 at a middle point to the late stage of overcharge. As a result, the present inventors made the following findings.

<<Conditions of the Lithium-Ion Secondary Battery 100 to the Late Stage of Overcharge>>

In the lithium-ion secondary battery 100, the width b1 of the negative electrode mixture layer 243 is wider than the width a1 of the positive electrode mixture layer 223 (i.e., b1>a1), as illustrated in FIGS. 2 and 3. In the lithium-ion secondary battery 100, the negative electrode mixture layer 243 is opposed to the positive electrode mixture layer 223 so as to cover the positive electrode mixture layer 223, while the separators 262 and 264 are interposed therebetween. When the temperature of the lithium-ion secondary battery 100 becomes high due to overcharge, shrinkage of the separators 262 and 264 takes place. The shrinkage of the separators 262 and 264 proceeds faster in the positive electrode side than in the negative electrode side. For this reason, the short circuit between the uncoated portion 222 of the positive electrode sheet 220 and the negative electrode current collector 241 starts from an edge 223a of the positive electrode mixture layer 223 on the uncoated portion 222 side. Failures in the late stage of overcharge are triggered by such short circuit. In addition, at the late stage of overcharge, the highest temperature is observed in the positive-electrode-side side end 300A of the battery case 300. The present inventors believe that the reason why such incident occurs is as follows.

<<Shrinkage of the Separators 262 and 264>>

The substrate material for the separators 262 and 264 is typically a porous polyolefin-based resin, as described previously. Therefore, if the temperature rises uniformly, the separators 262 and 264 will shrink uniformly. However, among the constituent components of the wound electrode body 200 in the lithium-ion secondary battery 100, the positive electrode current collector 221 and the negative electrode current collector 241 have relatively high thermal conductivity. Accordingly, the heat inside the wound electrode body 200 tends to escape outside through the positive electrode current collector 221 and the negative electrode current collector 241.

As described previously, an aluminum foil is used for the positive electrode current collector 221, and a copper foil for the negative electrode current collector 241. The thermal conductivity (unit: $W \cdot m^{-1} \cdot K^{-1}$) of aluminum (Al) in the vicinity of room temperature (about 20° C.) is about 240, and that of copper (Cu) is about 400. That is, the negative electrode current collector 241 (copper foil) has a higher thermal conductivity than the positive electrode current collector 221 (aluminum foil). Thus, the negative electrode side of the wound electrode body 200 tends to allow heat to escape more easily and get cold more readily than the positive electrode side. On the other hand, the positive electrode side of the wound electrode body 200 tends to preserve the heat more easily and become hot more readily than the negative electrode side. As a consequence, the shrinkage of the separators 262 and 264 proceeds quicker in the positive electrode side than in the negative electrode side.

<<Short Circuit Between the Positive Electrode and the Negative Electrode>>

On the positive electrode side, the portion near the edge 223a of the positive electrode mixture layer 223 on the uncoated portion 222 side is opposed to the negative electrode current collector 241 across the separators 262 and 264. As mentioned above, the shrinkage of the separators 262 and 264 proceeds quicker in the positive electrode side than in the negative electrode side. When the shrinkage of the separators 262 and 264 proceeds, the uncoated portion 222 of the positive electrode sheet 220 and the negative electrode current collector 241 cause short circuit at a portion near the edge portion 223a of the positive electrode mixture layer 223 on the uncoated portion 222 side.

In an overcharge condition, electrons ($e^-$) are stored in the negative electrode sheet 240 (the negative electrode mixture layer 243) of the lithium-ion secondary battery 100, so the potential difference between the positive electrode sheet 220 and the negative electrode sheet 240 is great. In addition, the uncoated portion 222 of the positive electrode sheet 220 is a metal foil, so the electrical resistance is considerably lower than that of the positive electrode mixture layer 223, which contains a lithium transition metal oxide. Accordingly, higher current flows when the uncoated portion 222 of the positive electrode sheet 220 comes into contact with the negative electrode sheet 240 (the negative electrode mixture layer 243) than when the positive electrode mixture layer 223 comes into contact with the negative electrode sheet 240 (the negative electrode mixture layer 243). Thus, the short circuit that occurs on the positive electrode side of the wound electrode body 200 [i.e., the short circuit that occurs between the uncoated portion 222 of the positive electrode sheet 220 and the negative electrode sheet 240 (the negative electrode mixture layer 243)] tends to cause higher current and tends to cause failures more easily.

On the negative electrode side, the positive electrode mixture layer 223 and the negative electrode mixture layer 243 are opposed to each other across the separators 262 and 264. The positive electrode mixture layer 223 has a higher electrical resistance than the positive electrode current collector 221. For this reason, even if the positive electrode mixture layer 223 and the negative electrode mixture layer 243 come into contact with each other, the resulting current will not be as high as the current caused when the uncoated portion 222 of the positive electrode sheet 220 and the negative electrode mixture layer 243 come into contact with each other on the positive electrode side. Therefore, the negative electrode side of the wound electrode body 200 less easily causes failures at the late stage of overcharge.

<<Highest Temperature Location in the Battery Case>>

The lithium-ion secondary battery with such a configuration experiences a high temperature at the late stage of overcharge. When the temperature of the lithium-ion secondary battery 100 becomes high, the electrolyte solution is decomposed, resulting in gas generation. At this time, the electrolyte solution that has infiltrated into the wound electrode body 200 is also decomposed, so gas is generated also in the wound electrode body 200. The gas generated in the wound electrode body 200 goes out into the gaps 310 and 312 at the opposite sides of the wound electrode body 200 through the gaps in the positive electrode sheet 220, the negative electrode sheet 240, and the separators 262 and 264, which are stacked one on top of the other, in the lateral directions (X1 and X2 in FIG. 1) of the sheets.

When the uncoated portion 222 of the positive electrode sheet 220 and the negative electrode sheet 240 (the negative electrode mixture layer 243) cause a short circuit in such a condition, a high-temperature gas is generated actively due to the abrupt temperature rise associated with the short circuit. The high-temperature gas generated proceeds through the gaps of the sheets in the wound electrode body 200 in the lateral directions (X1 and X2 in FIG. 1), and blows out from the opposite sides of the wound electrode body 200 toward the inner walls of the battery case 300. Consequently, the high-temperature gas blows onto the inner walls of the battery case 300. At this time, since the positive electrode side of the wound electrode body 200 becomes the starting point of the short circuit between the positive electrode sheet 220 and the negative electrode sheet 240, the high-temperature gas blows onto the inner wall of the battery case 300 on the positive electrode side. Consequently, at the late stage of overcharge, the positive-electrode-side sidewall 300A of the battery case 300 experiences the highest temperature.

The present inventors obtained such unique findings. According to such unique findings obtained by the present inventors, in the lithium-ion secondary battery 100, the short circuit between the uncoated portion 222 of the positive electrode sheet 220 and the negative electrode current collector 241 starts to take place at the portion near the edge portion 223a of the positive electrode mixture layer 223 on the uncoated portion 222 side. This triggers failures in the late stage of overcharge. Moreover, the positive-electrode-side sidewall 300A of the battery case 300 tends to be exposed to the gas generated by the short circuit, and experiences the highest temperature.

In view of such problems, it may be possible to provide a heat releasing member on the positive-electrode-side sidewall 300A of the battery case 300. However, merely providing the heat releasing member makes it inevitable to reduce the size of the wound electrode body 200. As a consequence, the volumetric energy density (Wh/L) of the lithium-ion secondary battery 100 is decreased, and the performance of the lithium-ion secondary battery 100 is lowered.

The lithium-ion secondary battery 100 was created based on the above-described findings obtained by the present inventors. As described previously, in the lithium-ion secondary battery 100, the battery case 300 has sidewalls 300A and 300B facing toward the respective side ends of the wound electrode body 200 that are at the opposite lateral sides of the positive electrode sheet 220, and of the sidewalls 300A and 300B, the one sidewall 300A (the positive-electrode-side sidewall), which faces toward the uncoated portion 222 of the positive electrode sheet 220, is thicker than the other sidewall 300B (the negative-electrode-side sidewall), which faces toward the opposite side (i.e., which faces toward the uncoated portion 242 of the negative electrode sheet 240). In other words, the relationship between the thickness A of the one sidewall 300A facing toward the uncoated portion 220 of the positive electrode sheet 222 and the thickness B of the other sidewall 300B facing toward the opposite side is A>B.

As a result, in the lithium-ion secondary battery 100, the positive electrode side of the battery case 300 shows higher strength, higher heat capacity, and higher heat resistance. Thus, even when a high-temperature gas blows out from the positive electrode side of the wound electrode body 200 toward the battery case 300, damages to the battery case 300 and deformation of the battery case 300 can be minimized.

Moreover, in the lithium-ion secondary battery 100, the wall thickness of the battery case 300 is made thicker only in the positive electrode side. This allows the weight of the battery case 300 to be less and also permits the battery case 300 to have a larger internal space than in the case where the entire battery case 300 is made thick in order to allow the positive electrode side to have necessary heat resistance. As a result, the gravimetric energy density and the volumetric energy density of the secondary battery can be improved.

It should be noted that the negative electrode side of the wound electrode body 200 is less likely to become the starting point of the short circuit than the positive electrode side, and the strength of the high-temperature gas blowing out from the wound electrode body 200 toward the battery case 300 is considerably weaker. Moreover, the negative electrode current collector 241 has a higher thermal conductivity than the positive electrode current collector 221, so the heat tends to be escape from the negative electrode side via the negative electrode current collector 241 more easily than from the positive electrode side. Therefore, the temperature of the negative-electrode-side sidewall 300B of the battery case 300 at the late stage of overcharge is lower than that of the positive electrode side. Thereby, even when the wall thickness of the battery case 300 on the negative electrode side is thinner than that of the positive electrode side, failures at the late stage of overcharge can be prevented.

When the thickness A of the one sidewall facing toward the uncoated portion of the positive electrode sheet and the thickness B of the other sidewall is A>B, the durability and heat resistance of the positive electrode side can be improved in comparison with the negative electrode side. In addition, the difference (A−B) between the thickness A of the one sidewall facing toward the uncoated portion of the positive electrode sheet and the thickness B of the other sidewall may be, for example, equal to or greater than 0.05 mm. For example, when the battery case 300 is made of aluminum, the strength and heat resistance can be improved with such a degree of wall thickness difference as described above. By making the positive-electrode-side sidewall 300A of the battery case 300 thicker with a thickness difference such as described above, it is possible to lessen the damages to the battery case 300 and deformation of the battery case 300 at the late stage of overcharge.

In addition, the ratio (A/B) of the thickness A of the one sidewall facing toward the positive electrode side and the thickness B of the other sidewall may be equal to or greater than 1.1. For example, when the thickness B of the negative-electrode-side sidewall 300B is 0.6 mm, the thickness A of the positive-electrode-side sidewall 300A should be set at equal to or greater than 0.66 mm. The thickness A of the one sidewall facing toward the uncoated portion of the positive electrode sheet and the thickness B of the other sidewall may be determined according to the ratio A/B of the thickness A of the positive-electrode-side sidewall 300A and the thickness B of the opposite-side sidewall 300B in this way. This makes it possible to provide an appropriate different in strength and heat resistance between the positive-electrode-side sidewall 300A and the negative-electrode-side sidewall 300B of the battery case 300, irrespective of the size or material of the battery case 300.

Furthermore, in the lithium-ion secondary battery 100, the positive electrode current collector has a thermal conductivity less than that of the negative electrode current collector, as described above. Thus, the negative electrode side of the wound electrode body 200 tends to allow heat to escape more easily and get cold more quickly than the positive electrode side, while the positive electrode side of the wound electrode body 200 tends to preserve the heat more easily and become hot more readily than the negative electrode side. As a consequence, the shrinkage of the separators 262 and 264 tends to proceed quicker in the positive electrode side than in the negative electrode side. Moreover, the positive electrode mixture layer 223 has a higher electrical resistance than the uncoated portion 222 of the positive electrode sheet 220. For this reason, the short circuit between the uncoated portion 222 of the positive electrode sheet 220 and the negative electrode mixture layer 243, which can occur on the positive electrode side of the wound electrode body 200, tends to trigger failures at the late stage of overcharge. When the short circuit between the uncoated portion 222 of the positive electrode sheet 220 and the negative electrode mixture layer 243 occurs, the high-temperature gas blows out from the positive electrode side of the wound electrode body 200 toward the side end of the battery case 300.

Thus, in the lithium-ion secondary battery 100, the fact that the thermal conductivity of the positive electrode current collector is lower than that of the negative electrode current collector is a cause of the deviation of the starting point of the short circuit at the late stage of overcharge to the positive electrode side of the wound electrode body 200. However, since the lithium-ion secondary battery 100 has a thicker wall thickness of the positive electrode side of the battery case 300, the positive electrode side of the battery case 300 exhibits high strength, higher heat capacity, and higher heat resistance. For this reason, even when high-temperature gas blows out from the positive electrode side of the wound electrode body 200 toward the battery case 300, damages to the battery case 300 and deformation of the battery case 300 can be minimized. Thus, the lithium-ion secondary battery 100 is suitable for such cases that the thermal conductivity of the positive electrode current collector is lower than that of the negative electrode current collector and that the negative electrode mixture layer is covered by a heat-resistant layer.

Hereinbelow, a comparative test carried out by the present inventors is described as an example.

The present inventors prepared a plurality of lithium-ion secondary batteries using, as the battery case 300, battery cases each made of aluminum having a thickness of 0.5 mm and in which thicknesses A and B (see FIG. 1) of the opposite sidewalls 300A and 300B of the battery case 300 are varied. Each of the lithium-ion secondary batteries was put under a condition of a late stage of overcharge, and the highest temperature of the battery case 300 thereof was obtained.

The battery case 300 used here was a case in a flat-box outer shape having the following inner dimensions: height 90 mm, width 110 mm, and depth 12 mm. On the other hand, the width of the wound electrode body 200 was 105 mm (d in FIG. 2) along the lateral direction of the positive electrode sheet 220, the width of the positive electrode mixture layer 223 (a1 in FIG. 2) was 74 mm, the width of the negative electrode mixture layer 243 was 78 mm (b1 in FIG. 2), and the width of the separators 262 and 264 was 85 mm (c1, c2 in FIG. 2). The inner walls of the battery case 300 were covered and insulated with a PP film. The wound electrode body 200 is disposed at the middle of the battery case 300 with respect to the lateral direction of the positive electrode sheet 220. The test batteries prepared in this manner were subjected to a predetermined conditioning process (pre-charging), and were charged to a late stage of overcharge with a charge current of 20 A, an upper limit voltage of 100 V, and an ambient temperature of 25° C. For each sample, five test batteries with the same conditions were prepared, and the mean value thereof was taken. The rest of the structure of each sample was made in accordance with the above-described structure of the lithium-ion secondary battery 100.

Part of the results of the test are shown in Table 1.

TABLE 1

|  | Thickness A (mm) | Thickness B (mm) | Highest case temperature (° C.) |
| --- | --- | --- | --- |
| Sample 1 | 0.7 | 0.6 | 555 |
| Sample 2 | 0.75 | 0.55 | 540 |
| Sample 3 | 0.8 | 0.5 | 530 |
| Sample 4 | 0.65 | 0.65 | 600 |
| Sample 5 | 0.6 | 0.7 | 690 |
| Sample 6 | 0.55 | 0.75 | 780 |

In each sample, the maximum temperature of the battery case 300 (maximum case temperature) was obtained at the positive-electrode-side sidewalls 300A and 300B of the battery case 300.

Sample 1 had a thickness A of 0.7 mm and a thickness B of 0.6 mm, and the maximum case temperature was about 555° C.

Sample 2 had a thickness A of 0.75 mm and a thickness B of 0.55 mm, and the maximum case temperature was about 540° C.

Sample 3 had a thickness A of 0.8 mm and a thickness B of 0.5 mm, and the maximum case temperature was about 530° C.

Sample 4 had a thickness A of 0.65 mm and a thickness B of 0.65 mm, and the maximum case temperature was about 600° C.

Sample 5 had a thickness A of 0.6 mm and a thickness B of 0.7 mm, and the maximum case temperature was about 690° C.

Sample 6 had a thickness A of 0.55 mm and a thickness B of 0.7 mm, and the maximum case temperature was about 780° C.

Table 1 shows part of the test carried out by the present inventors, which demonstrates that the maximum case temperature could be reduced when the thickness A is thicker than the thickness B (i.e., when A>B) with respect to the lateral direction of the positive electrode sheet 220. Moreover, damages to the battery case 300 could be minimized.

Hereinabove, the lithium-ion secondary battery 100 according to one embodiment of the present invention has been described in various ways, but the secondary battery according to the present invention is not limited by the foregoing embodiment.

In the foregoing embodiment, a lithium-ion secondary battery was illustrated as an example of the secondary battery. However, the structure of the lithium-ion secondary battery 100 may be applied to other types of secondary batteries. The dimensions of each of the constituent parts of the lithium-ion secondary battery 100 and the materials used for the positive electrode mixture, the negative electrode mixture, the electrolyte solution, the positive electrode current collector 221, the negative electrode current collector 241, the separators 262 and 264, and so forth may be varied in many ways. The shape of the case of the lithium-ion secondary battery is not limited to the flat rectangular shape. For example, the present invention is suitable in the cases where the wound electrode body is enclosed in a battery case formed so that at least one side thereof is open and that the side ends of the battery case are opposed perpendicular to the winding axis of the wound electrode body, as in the foregoing embodiment. The present invention can be accomplished by subjecting the series of battery cases to a special process in which, of the sidewalls of the battery case facing toward the respective side ends of the wound electrode body that are at the opposite lateral sides of the positive electrode sheet (i.e., the respective side ends of the wound electrode body that are across the winding axis of the wound electrode body), one of the sidewall facing toward the uncoated portion of the positive electrode sheet is made thicker than the other one of the sidewalls.

As described above, the secondary battery according to the present invention can improve safety at the late stage of overcharge, and at the same time can improve the volumetric energy density (Wh/L) and gravimetric energy density (Wh/kg) with the same size of secondary battery. Therefore, the secondary battery of the invention can be used suitably for the power source of a motor (electric motor) to be mounted on vehicles such as automobiles. The invention is especially useful for on-vehicle secondary batteries.

Figure 5:
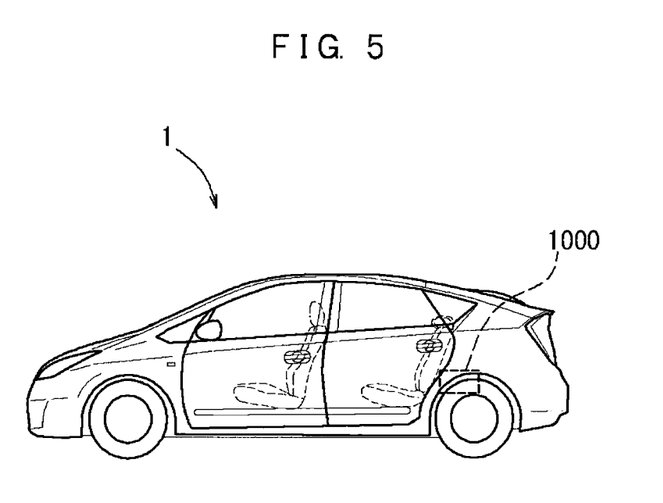
FIG. 5 is a drawing illustrating a vehicle incorporating the lithium-ion secondary battery.

In this case, it is possible to construct a battery module by combining a plurality of the secondary batteries. For on-vehicle purposes, it is possible to use the secondary battery described above or a battery module including a plurality of the secondary batteries described above. As schematically illustrated in FIG. 5, the invention provides a vehicle 1 having the lithium-ion secondary battery according to the present invention (which may be a battery module 1000 in which a plurality of the above-described batteries are connected in series) as the electric power source. Examples of such a vehicle include automobiles, especially an automobile having an electric motor, such as a hybrid electric vehicle, an electric vehicle, and a fuel-cell automobile.

REFERENCE SIGNS LIST

1 Vehicle
100 Lithium-ion secondary battery
200 Wound electrode body
220 Positive electrode sheet
221 Positive electrode current collector
222 Uncoated portion
222a Intermediate portion
223 Positive electrode mixture layer
223a Positive electrode mixture layer uncoated portion-side edge
224 Positive electrode mixture
240 Negative electrode sheet
241 Negative electrode current collector
242 Uncoated portion
243 Negative electrode mixture layer
244 Negative electrode mixture
245 Heat-resistant layer
262 Separator
264 Separator
300 Battery case
300A Sidewall
310, 312 Gap

320 Case main body
322 Joint portion
340 Lid
360 Safety vent
400 Positioning member
420 Electrode terminal
440 Electrode terminal
1000 Battery module
A Distance: thickness of the positive-electrode-side sidewall (the sidewall facing toward the uncoated portion of the positive electrode sheet) of the battery case
B Distance: thickness of the negative-electrode-side sidewall (the sidewall facing toward the opposite side) of the battery case

The invention claimed is:

1. A secondary battery comprising:
a wound electrode body comprising a strip-shaped positive electrode sheet, a strip-shaped negative electrode sheet, and a strip-shaped separator, the positive and negative electrode sheets stacked and wound with the separator interposed therebetween; and
a battery case enclosing the wound electrode body,
the positive electrode sheet comprising:
   a strip-shaped positive electrode current collector;
   an uncoated portion provided in the positive electrode current collector along one lateral-side edge of the positive electrode current collector; and
   a positive electrode mixture layer comprising a positive electrode mixture, coated on both surfaces of the positive electrode current collector except the uncoated portion and containing a positive electrode active material;
the negative electrode sheet comprising:
   a strip-shaped negative electrode current collector;
   an uncoated portion provided in the negative electrode current collector along one lateral-side edge of the negative electrode current collector; and
   a negative electrode mixture layer comprising a negative electrode mixture, coated on both surfaces of the negative electrode current collector except the uncoated portion so as to be wider than the positive electrode mixture layer and containing a positive electrode active material;
wherein the positive electrode sheet and the negative electrode sheet are opposed to each other so that the positive electrode mixture layer is covered by the negative electrode mixture layer, and the positive electrode sheet and the negative electrode sheet are stacked on each other so that the uncoated portion of the positive electrode sheet and the uncoated portion of the negative electrode sheet protrude in opposite lateral directions from the separator;
wherein the wound electrode body is wound around a winding axis set in a lateral direction of the stacked positive electrode sheet;
wherein the battery case has sidewalls facing toward respective side ends of the wound electrode body, the side ends being at opposite lateral sides of the positive electrode sheet, and of the sidewalls of the battery case, one of the sidewalls facing toward the uncoated portion of the positive electrode sheet is thicker than the other one of the sidewalls; and
wherein the positive electrode current collector has a thermal conductivity less than that of the negative electrode current collector.

2. The secondary battery according to claim 1, wherein the difference (A-B) between a thickness A of the one of the sidewalls facing toward the uncoated portion of the positive electrode sheet and a thickness B of the other sidewall is equal to or greater than 0.05 mm.

3. The secondary battery according to claim 1, wherein the ratio (A/B) of a thickness A of the one of the sidewalls facing toward the uncoated portion of the positive electrode sheet and a thickness B of the other sidewall is equal to or greater than 1.1.

4. The secondary battery according to claim 1, wherein the battery case comprises a case main body in a closed-bottom quadrangular prismatic tubular shape and a lid closing an opening of the case main body.

5. A battery module comprising a plurality of the secondary batteries according to claim 1.

6. A vehicle incorporating the secondary battery according to claim 1.

7. A vehicle incorporating the battery module according to claim 5.

* * * * *